United States Patent [19]

Brenholt

[11] 4,204,846

[45] May 27, 1980

[54] SELF-CLEANING AIR FILTER

[75] Inventor: David L. Brenholt, Dundas, Minn.

[73] Assignee: Donaldson Company, Inc., Minneapolis, Minn.

[21] Appl. No.: 909,840

[22] Filed: May 26, 1978

[51] Int. Cl.$^2$ .......................................... B01D 46/04
[52] U.S. Cl. ...................... 55/272; 55/288; 55/304; 55/429; 55/482; 55/493; 55/497
[58] Field of Search ................. 55/271, 272, 283, 288, 55/304, 305, 381, 429, 482, 493, 497, 498, DIG. 3; 15/347, 352

[56] References Cited

U.S. PATENT DOCUMENTS

| 980,832 | 1/1911 | Pittelkow | 55/482 |
|---|---|---|---|
| 2,350,011 | 5/1944 | Black | 55/304 |
| 2,409,078 | 10/1946 | Swann | 55/493 |
| 2,503,568 | 4/1950 | Timm | 55/304 |
| 2,788,860 | 4/1957 | Turner | 55/400 |
| 2,994,407 | 8/1961 | Van Diepenbroek | 55/317 |
| 3,078,650 | 2/1963 | Anderson et al. | 55/337 |
| 3,116,990 | 1/1964 | Duer | 55/294 |
| 3,320,727 | 5/1967 | Farley et al. | 55/429 |
| 3,413,779 | 12/1968 | Takahashi et al. | 55/272 |
| 3,447,290 | 6/1969 | Flory | 55/322 |
| 3,458,050 | 7/1969 | Cooper | 210/443 |
| 3,486,314 | 12/1969 | Herrington | 55/408 |
| 3,819,052 | 6/1974 | Firth | 210/90 |
| 3,858,793 | 1/1975 | Dudrey | 233/2 |
| 4,067,708 | 1/1978 | Bykhover et al. | 55/304 |
| 4,135,899 | 1/1979 | Gauer | 55/482 |

FOREIGN PATENT DOCUMENTS

| 272544 | 9/1927 | United Kingdom | 55/288 |
|---|---|---|---|
| 461735 | 4/1975 | U.S.S.R. | 55/304 |

OTHER PUBLICATIONS

Donaldson Company, Inc., Bulletin No. 1200-272, At Last a Premium Air Cleaner That Gives You the Design Flexibility You Need.

*Primary Examiner*—David L. Lacey
*Attorney, Agent, or Firm*—Merchant, Gould, Smith, Edell, Welter & Schmidt

[57] ABSTRACT

An apparatus for filtering particulate material from air and for removing the particulate material collected upon a filter is disclosed. The apparatus includes a housing having an air inlet and an air outlet. A hollow longitudinally extending filter is secured within the housing. The filter has an outer surface, an open interior, opposite ends, and a longitudinal axis extending between the ends. The filter is formed of a porous media. One end of the filter is removably secured relative to the housing so that the longitudinal axis of the filter extends generally vertically. The other end of the filter is closed. A first chamber is defined around the outer surface of the filter. The chamber is in communication with the air inlet whereby air moving from the inlet to the outlet passes through the filter into the interior thereof and deposits particulate material on the outer surface of the filter. A mechanism is provided for removing the particulate material collected on the outer surface of the filter. The mechanism for removing the particulate material includes a device connected to the closed end for rotating the closed end and the end of the filter attached thereto to twist the filter.

29 Claims, 21 Drawing Figures

SELF-CLEANING AIR FILTER

BACKGROUND OF THE INVENTION

The present invention relates broadly to devices for filtering particulate material from a gaseous medium. The present invention finds particular application to industrial cabinet-type collectors. Cabinet collectors are used to collect shavings, filings and the like, produced in machining, grinding or cutting processes, and to collect dust in inductrial and pharmaceutical settings. When the cabinet collector is utilized with a tooling machine, an air intake or suction nozzle is placed adjacent a machining tool to collect the small particulate material produced during the machining process. The particulate material-laden air is transported to a plenum or chamber containing a filtering element which removes a substantial portion of the particulate material from the air.

One type of filter utilized in cabinet colletors is made of pouches sewn from cotton sateen with an internal wire mesh separator. As particulate material collects upon the outer surface of the pouches, a cleaning operation must be performed to remove the particulate material. The pouches may be periodically cleaned by a foot-operated mechanism which shakes the filter pouches or by a motor-driven mechanism which also shakes the filter pouches.

The present invention relates to a novel apparatus for cleaning the particulate material collected upon a filter made of a porous media. A co-pending application Ser. No. 909,841 of James L. Berkhoel, and assigned to the assignee of the present application, also discloses an apparatus for cleaning the particulate material collected upon a filter made of a porous media. The porous media is preferably pleated. By pleating a porous media a large amount of filtering surface can be placed in a small area. Thus, a filter made of a pleated porous media has a larger filtering surface than a conventional bag or pouch filter.

SUMMARY OF THE INVENTION

The apparatus of the present invention is designed to remove the particulate material from air passing through a filter and to remove the particulate material collected upon the filter. The apparatus includes a housing having an air inlet and an air outlet. A hollow longitudinally extending filter is secured within the housing. The filter has an outer surface, an open interior, opposite ends, and a longitudinal axis extending between the ends. The filter is formed of a porous media. One end of the filter is removably secured relative to the housing so that the longitudinal axis of the filter extends generally vertically. The other end of the filter is closed. A first chamber is defined around the outer surface of the filter. The chamber is in communication with the air inlet whereby air moving from the inlet to the outlet passes through the filter into the interior thereof and deposits particulate material on the outer surface of the filter. A mechanism is provided for removing the particulate material collected on the outer surface of the filter. The mechanism for removing the particulate material includes a device connected to the closed end for rotating the closed end and the end of the filter attached thereto to twist the filter.

In the preferred embodiment, the porous media is pleated and a closure plate is attached to and seals the closed end. The rotating device includes a rod rotatable about its axis. The rod extends from the plate in a direction generally transverse to a major face of the plate. The rod is coupled to the plate in such a manner that the rotary motion of the rod is transferred to the plate while permitting the rod to move transversely of the plate. A means is provided for intermittently rotating the rod.

Several embodiments of means for rotating the rod are disclosed. One embodiment utilizes a camming mechanism driven by an electric motor which is discrete from a motor which drives a blower fan. The camming mechanism rotates the rod sequentially in opposite rotative directions. In another embodiment, a fan motor is provided with an outer casing. The rod is connected to the outer casing. The motor casing is mounted to the housing in such a manner to allow the motor casing to rotate relative to the housing when the motor is started. In a third embodiment, the rod extends outwardly from the plate into the hollow interior of the filter. The rod is coupled through an electromagnetic clutch to a drive shaft of a fan motor disposed within the housing. A mechanism intermittently activates the electromagnetic clutch after the fan motor has been shut off. The rod is thereby intermittently connected to the drive shaft and the winding down momentum of the fan motor rotates the drive shaft for a short period of time.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

DETAILED DESCRIPTION OF THE PREFERRED EMBODIMENT

Referring to the drawings in detail, wherein like numerals indicate like elements, there is shown an apparatus in accordance with the present invention designated generally at 10. Apparatus 10 has a housing 12 which includes a central section 14, a removable top section 16, a removable bottom tray 18, and a base 19. The top section 16 is removable secured to the central section 14 by a plurality of snap-type clamps 20. the bottom tray section 18 is in the form of a tray or drawer which is slidably received upon the base 19 within the housing 12. The tray section 18 is removable from the housing 12 through a hole 21 in the housing 12. A cover 23 is received around one end of the tray section 18 and the hole 21. The cover 23 is removably attached to the housing by clamps 22. A spring wire 25 is attached to an end of the tray section 18 and contacts an inner surface of the cover 23. The cover 23 depresses the spring wire 25 thereby holding the tray section 18 securely in the housing 12. The central section 14 is formed of a solid front wall 24, a solid back wall 26, a solid first side wall 28, and a second side wall 30. The side wall 30 has an air inlet aperture 32 extending through it and an air outlet door 34 pivotably attached to it by a hinge 36. A conduit 35 is attached in fluid communication to the air inlet aperture 32 to form an air inlet conduit to the apparatus 10. A plurality of louvers or slots 38 are cut through the door 34 to provide outlet apertures for the air passing out of the apparatus 10. The door may be secured shut by any conventional clip or lock 40.

The interior of the housing is divided into three chambers: a filtering chamber 42, an air inlet chamber 44, and an air outlet chamber 46. The filtering chamber 42 is disposed about a filtering means designated generally as 48. The air inlet chamber 44 is disposed adjacent the air inlet aperture 32 and serves as an initial air inlet and separation chamber. The air outlet chamber 46 is disposed about a fan mechanism 50. The fan mechanism 50 moves air into the air inlet chamber 44, the filtering chamber 42, then to air outlet chamber 46, and out the slots 38.

The air inlet chamber 44 is bounded on two sides by the front and back walls 24, 26, on another side by a portion of the side wall 30, on the top by a solid partition 52, on the bottom by a portion of a bottom wall 54 of the tray section 18, and on the last side by a perforate partition 56 and a solid or imperforate dividing wall 58 of the tray section 18. The perforate partition 56 has a plurality of relatively large apertures 60 through it. The perforate partition 56 serves as an initial filtering or screening mechanism to filter out large particulate material from the air passing through the air inlet chamber 44 to the filtering chamber 42.

Figure 1:
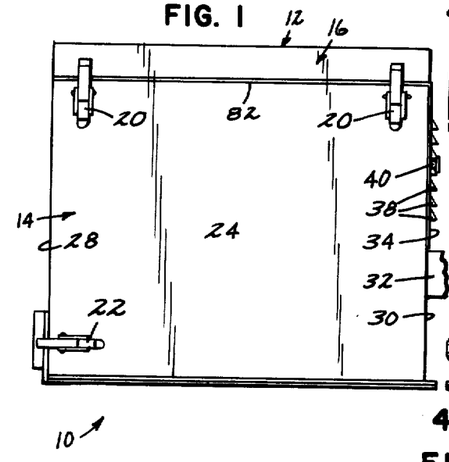
FIG. 1 is a front elevational view of a first embodiment of an appartus in accordance with the present invention.
Figures 2, 3:
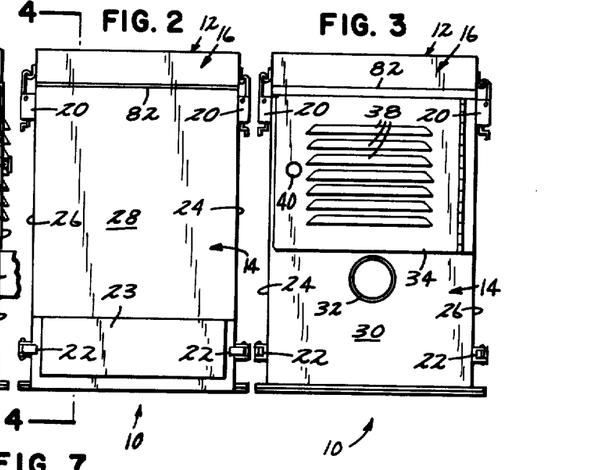
FIG. 2 is a side elevational view illustrating a first side of the apparatus shown in FIG. 1.
FIG. 3 is a side elevational view illustrating the other side of the apparatus shown in FIG. 1.
Figure 4:
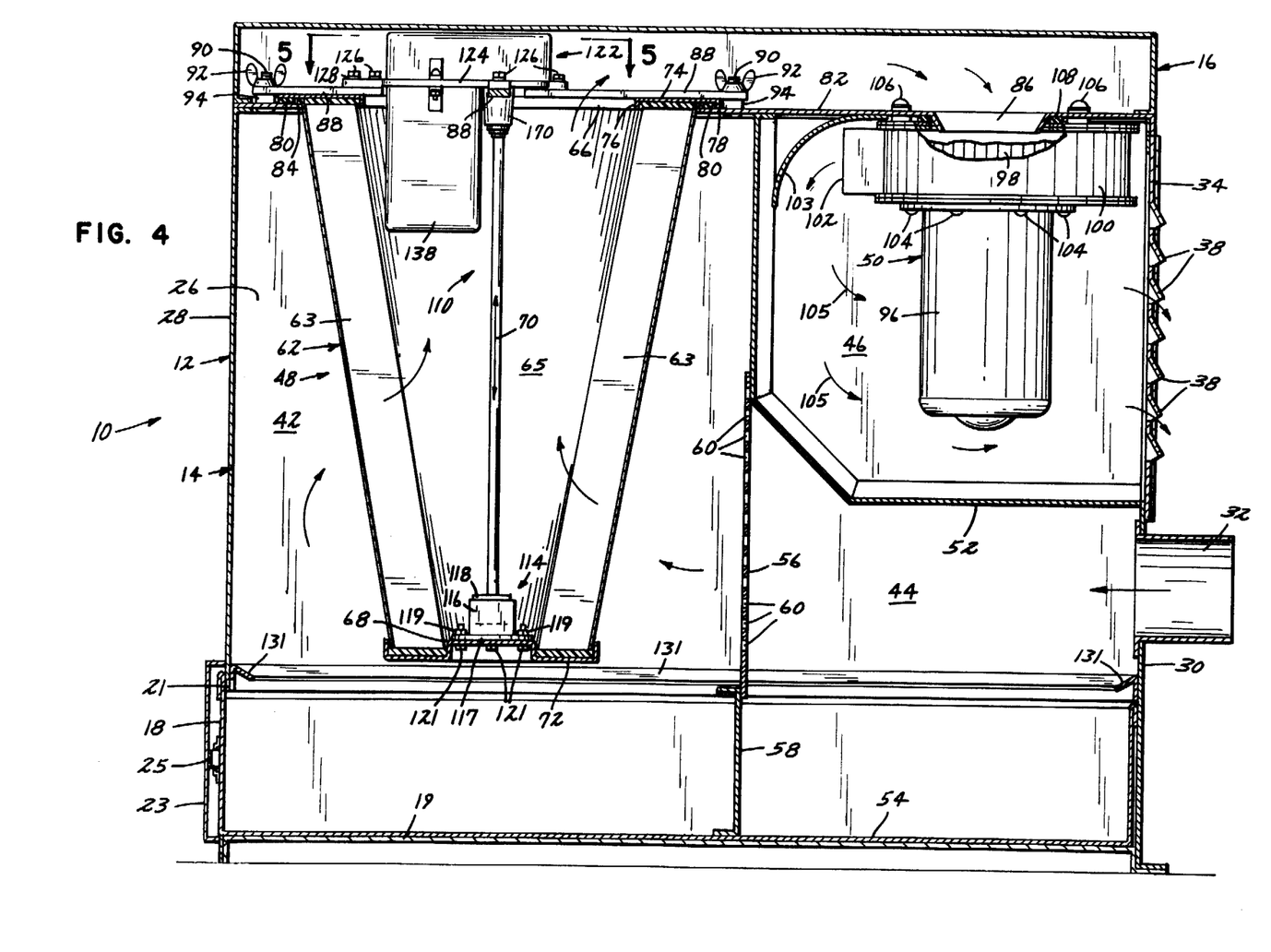
FIG. 4 is a view taken along lines 4—4 of FIG. 2.

The filtering means 48 includes a filter 62. The filter 62 is formed of a porous media which is preferably pleated. The pleated porous media is preferably made of a paper-like material from fibers of a cellulose or inorganic material. The filter 62 has a hollow interior 65, an open top end 66 and an open bottom end 68. A longitudinal axis of the filter, indicated as arrows 70, extends between the open ends 66, 68. Pleats 63 of the porous media are seen in FIG. 4. The pleats 63 run generally parallel to the longitudinal axis of the filter 62. The open end 66 has a larger diameter or transverse dimension than the open end 68. The open top end 66 is removably secured relative to the housing 12. A closure plate 72 is secured to the open bottom end 68 and forms a means for sealing or closing the end 68. An annular cover 74 is attached to the uppermost edge or rim of the filter 62. The annular cover 74 includes an inner angled edge 76 which extends into the hollow interior 65 of the filter 62. An outer angled edge 78 extends around the outer circumference of the annular cover 74. A gasket 80 is secured within the angled corner formed by the outer angled edge 78 and extends around the entire circumference of the annular cover 74.

An upper partition or dividing plate 82 is secured to the upper edges of the walls 24, 26, 28 and 30 of the central section 14. A first hole 84 extends through the upper partition 82 and is aligned with the filtering chamber 42. A second hole 86 extends through the upper partition 82 and is aligned with the air outlet chamber 46. The filter 62 extends downwardly from the first hole 84 into the filtering chamber 42 and the hollow interior 65 is in direct fluid communication with the hole 86.

Figure 12:
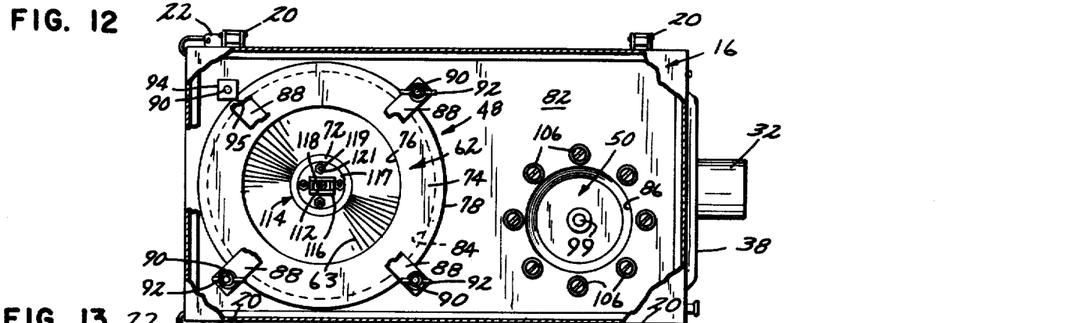
FIG. 12 is a top plan view, paritally broken away, of the embodiment of the invention illustrated in FIGS. 1-11.

A plurality of support arms 88 are secured to the partition 82. The arms 88 are disposed above the annular cover 74 to hold the filter 62 in place within the first hole 84. A plurality of bolts 90 are welded to the upper partition 82 and extend upwardly therefrom. A square nut 94 screws down upon each of the bolts 90. At least one of the square nuts 94, as shown in FIG. 12, is attached to the partition 82 in a position such that a corner 95 of the last-mentioned square nut 94 extends inwardly of the outer perimeter of the annular cover 74. The annular cover 74 has a notch to receive the corner 95 of the square nut 94 for the purpose of aligning the filter 62 in the hole 84. Each bolt 90 basses through a hole in one of the support arms 88. Wing nuts 92 screw onto the bolts 90 to secure the support arms in position. The gasket 80 is sized so that when the wing nuts 92 secure the support arms 88 in position, the gasket 80 is compressed upon the upper partition 82 to provide an airtight seal between the upper end of the filter 62 and the partition 82.

The fan mechanism 50 extends downwardly from and is in fluid communication with the second hole 86. The fan mechanism 50 includes a fan or blower motor 96 which drives a fan wheel 98 via a drive shaft 99. A fan scroll or encasement 100 surrounds the fan wheel 98. An outlet port 102 is formed in the fan scroll 100. When the motor 96 rotates the fan wheel 98, the rotating fan wheel 98 draws air in through the hole 86 and forces the air out of the outlet port 102 into the air outlet chamber 46. The motor 96 is secured to the bottom of the fan scroll 100 by fasteners 104. The entire fan mechanism 50 is secured in place by attaching the uppermost edge of the fan scroll 100 to the lower surface of the upper partition 82 by any type of conventional fastener such as screws or bolts 106. So that the air flow out of the fan scroll 100 is constrained to move through the outlet port 102, a gasket 108 is interposed between the upper surface of the fan scroll 100 and the lower surface of the upper partition 82. A curved baffle 103 is attached to the partition 82 and is disposed adjacent the outlet port 102. The baffle 103 aids in creating an air flow about the motor 96, as indicated by arrows 105. A conventional electric motor may be utilized as the fan or blower motor 96 so long as the motor has a sufficient power to drive the fan wheel at a speed which will draw air completely through the apparatus 10. A ⅓ horsepower electric motor which rotates at 3,450 r.p.m. has been found suitable.

Figures 7, 8:
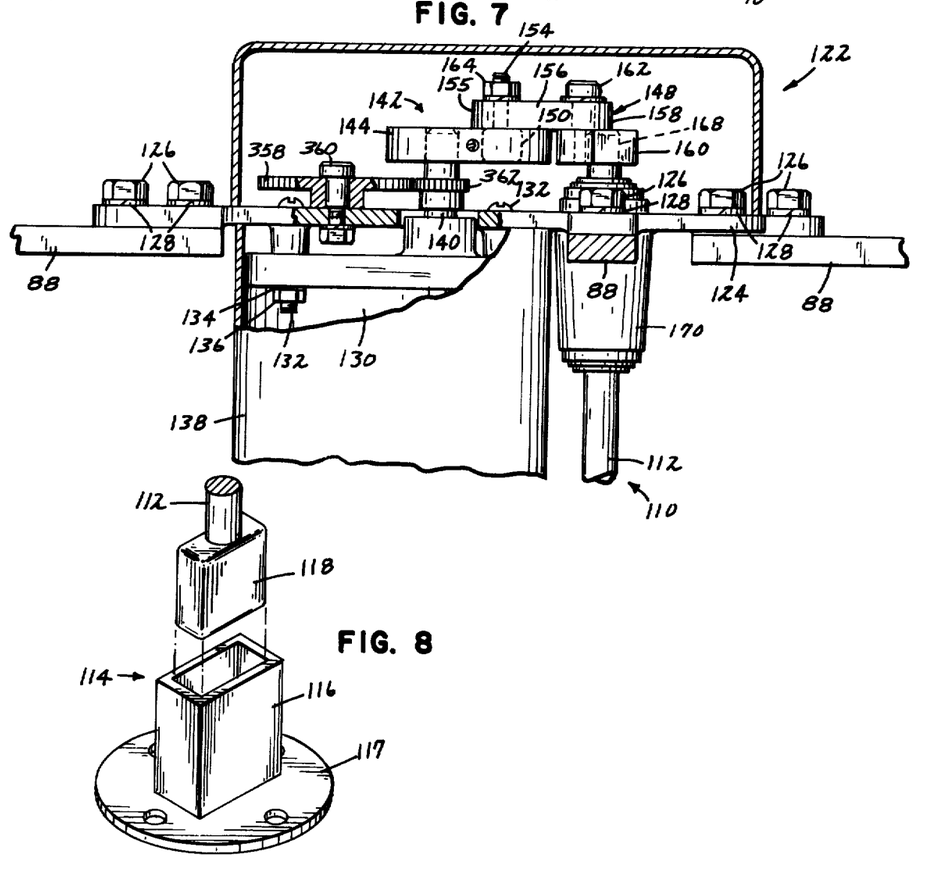
FIG. 7 is a section view similar to FIG. 4 illstrating the rod rotating mechanism on an enlarged scale.
FIG. 8 is a perspective view in an enlarged scale of a coupling mechanism for coupling the rotatable rod to the closure plate.

A means for removing particulate material collected upon the outer surface of the filter 62, designated generally as 110, is coupled to the filter 62. The means 110 includes a rotatable torque rod 112. The rod 112 extends along the axis 70 and is drivingly coupled to the closure plate 72 by a coupling means 114. The coupling means 114 is formed of a hollow rectangular-shaped receiving box 116 and a mating rectangular-shaped block or tongue 118. The receiving box 116 is fixedly secured to a circular plate 117. The circular plate 117 is attached to the closure plate 72 within the hollow interior 65 by means of nuts 119 and bolts 121. The block 118 is fixedly secured to the lower end of the torque rod 112. The box 116 and block 118 are shaped so that the block 118 slidingly fits within the box 116. Also, the combined length of the rod 112 and the block 118 is such that in the neutral position of the filter 62 (wherein the filter 62 is not twisted), a space exists between the lowermost end of the block 118 and the bottom of the box 116. The box 116 and the closure plate 72 are thus capable of moving upwardly with respect to the torque rod 112. Since the box 116 and the block 118 have flat mating surfaces, any rotation of the rod 112 is transmitted to the closure plate 72.

Figure 5:
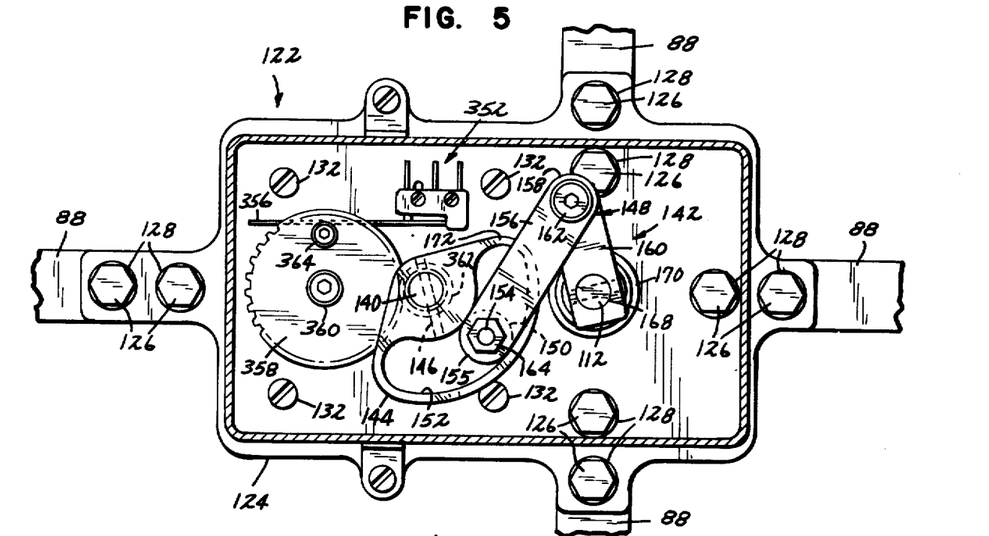
FIG. 5 is a view taken along lines 5—5 of FIG. 4 illustrating a first embodiment of a camming mechanism of a neutral position.
Figure 6:
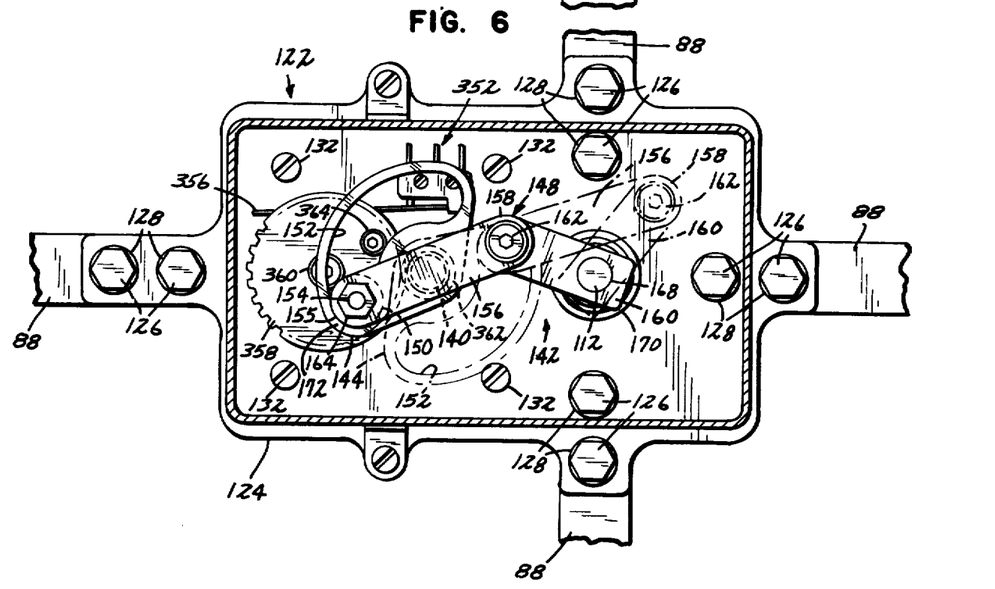
FIG. 6 is a view taken along lines 5—5 of FIG. 4 illustrating the first embodiment of the camming mechanism in other positions.

A means for rotating the torque rod 112, designated generally as 122, is drivingly attached to the upper end of the torque rod 112. Details of a first embodiment of the rod rotating means 122 are best seen in FIGS. 5, 6 and 7. A mounting plate 124 supports the rotating means 122 in position. The mounting plate 124 is fixedly secured to the support arms 88 by bolts 126 and lock washers 128. A drive motor 130 is supported below the mounting plate 124 and is attached thereto by screws 132, lock washers 134 and nuts 136. Only one complete set of screws 132, washers 134 and nuts 136 is shown in FIG. 7, however, a plurality of such sets are utilized to secure the drive motor 130 to the mounting plate 124. A motor cover 138 surrounds the drive motor 130.

A drive shaft 140 extends upwardly from the drive motor 130 through a hole in the mounting plate 124. The drive shaft 140 is rotatably driven by the motor 130. A camming means, designated generally as 142, converts continuous rotation in one direction of the drive shaft 140 to intermittent rotation of the torque rod 112 in a manner described hereinafter. The camming means 142 includes a slotted crank or cam plate 144 fixedly secured to the drive shaft 140. So that the position of the cam plate 144 may be adjusted upon the drive shaft 140, a set screw 146 is utilized to secure the cam plate 144 in position relative to the drive shaft 140.

A cam follower 148 is drivingly coupled to the cam plate 144. The cam follower 148 includes a cam linkage arm 156 and a torque arm 160. A cam bearing 150 is rotatably carried at one end 155 of the linkage arm 156 and is slidingly received within a slot 152 of the cam plate 144. The cam bearing 150 is rotatably carried on a pin 154. The pin 154 is attached at the end 155 of the cam linkage arm 156 by means of a fastener 164. The fastener 164 secures the pin 154 and the cam bearing 150 to the linkage arm 156 in such a manner that the cam bearing 150 is freely rotatable with respect to the linkage 156. The other end 158 of the linkage arm 156 is coupled to the torque arm 160 by a shoulder bolt 162. The shoulder bolt 162 secures the linkage arm 156 and the torque arm 160 in such a manner that the linkage arm 156 is free to pivot with respect to the torque arm 160.

The torque arm 160 is fixedly secured to a top end 168 of the torque rod 112. The torque rod 112 is held in position by a bearing 170. The bearing 170 holds the torque rod 112 in a fixed horizontal and vertical position while permitting the rod 112 to rotate about its longitudinal axis. Since the torque arm 160 is fixedly secured to the top end 168 of the torque rod 112, any pivotal motion of the torque arm 160 is transmitted as rotary motion to the torque rod 112.

FIG. 5 illustrates the position of the cam plate 144 and the cam follower 148 in the neutral position of the filter 62 wherein the filter 62 is resting in a natural untwisted state. In this neutral position, the cam bearing 150 is disposed generally within the center of the slot 152. In order to twist the filter 62, the drive shaft 140 is driven in a clockwise direction as viewed in FIGS. 5 and 6. The cam plate 144 is thus also rotated in a clockwise direction. The rod 112 is shown in a neutral position in FIGS. 5 and 9. The rod 112 is biased to the neutral position by the natural tendency of the filter 62 to remain in an untwisted condition. The drive shaft 140 and the rod 112 are so disposed that the camming means 142 causes the rod 112 to rotate through discrete angular rotations of less than 90° in opposite directions. The camming means 142 also permits the natural tendency of the filter 62 to return to the neutral position to snap the filter 62 back to the neutral position between the rotation of the rod 112 in the opposite directions.

The cam plate 144 rotates in a clockwise direction, as seen in FIG. 5. The linkage arm 156 and the torque arm 160 remain in the position shown in FIG. 5 until an end portion 172 of the cam plate 144 contacts the cam bearing 150. Further rotation of the cam plate 144 moves the bearing 150 along with the rotating cam plate 144. The motion of the cam bearing 150 moves linkage arm 156 and causes the torque arm 160 and torque rod 112 to rotate in a counterclockwise direction. The filter 62 is thereby twisted in a counterclockwise direction. The turning of the torque arm 160 in a counterclockwise direction continues until the linkage arm 156 reaches a central position shown in full line in FIG. 6. After this central position is reached, the bearing 150 is free to slide within the slot 152 ahead of the end portion 172. The motion of the bearing 150 ahead of the end portion 172 is caused by the natural biasing of the filter 62 to return to its neutral position. The return of the filter 62 to the neutral position occurs in a quick snap-type action which aids in the release of the particulate material from the outer surface of the filter 62.

The snapping of the filter 62 and the rod 112 to the neutral position returns the torque arm 160 to a position wherein the bearing 150 is again out of contact with the end portion 172. As the cam plate 144 continues to rotate, the end portion 172 again contacts the bearing 150 and the torque arm 160 is pushed in a clockwise direction. The end portion 172 continues to contact the bearing 150 and move the torque arm 160 in a clockwise direction to a second centering position shown in phantom line in FIG. 6. Beyond the second centering position, the follower 150 is free to slide within the slot 152 to return to the natural position shown in FIG. 5. Again the natural bias of the filter 62 causes the filter 62 and the rod 112 to snap back to the neutral position. By continuing to rotate the cam plate 144, the twisting and snapping operation of the filter 62 can be repeated. As will be explained hereinafter, a mechanism is provided for automatically causing a selected number of rotations of the drive shaft 140 to occur.

Figure 13:
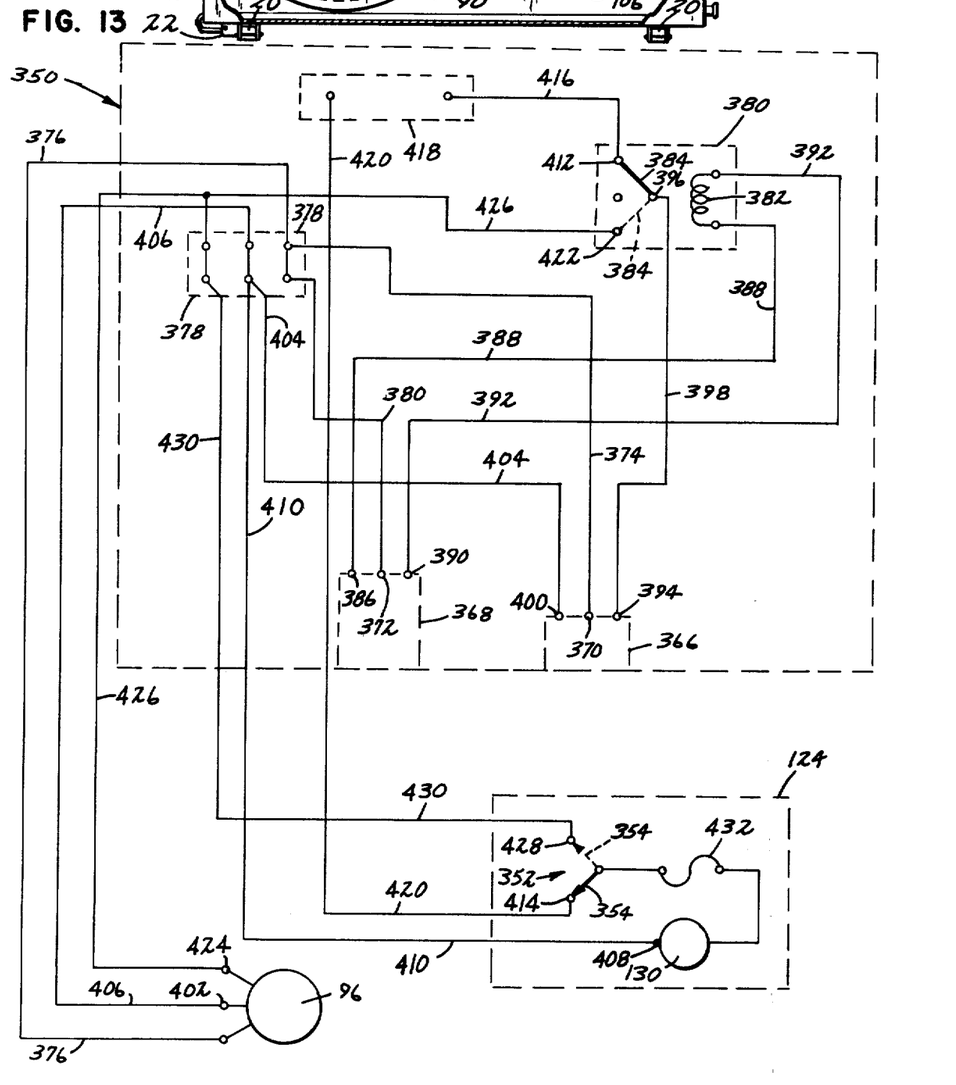
FIG. 13 is an electrical diagram illustrating a control mechanism for the embodiment of the invention illustrated in FIGS. 1-11.

FIG. 13 illustrates a circuit diagram of a control circuit 350 which is preferably used to control the operation of the apparatus 10. The circuit 350 is utilized to control the operation of the fan motor 96 and the drive motor 130. The control circuit 350 includes a microswitch 352 which is supported on mounting plate 124. The microswitch 352 includes a contact arm 354. The contact arm 354 is shown in FIG. 13 in a first position by dashed lines and in a second position by a solid line. The position of the contact arm 354 is controlled by an actuating lever 356 which is shown in FIGS. 5 and 6. A timing gear 358 is supported for rotary motion about a pin 360 on the mounting plate 124. The timing gear 358 engages and is driven by a drive gear 362. The drive gear 362 is fixedly secured to the drive shaft 140 for rotation therewith. The timing gear 358 is in a three-to-one gear ratio to the drive gear 362. Thus, for one rotation of the timing gear 358. The drive gear 362 rotates three times. Other gear ratios may be chosen dependent upon the number of rotations of the drive shaft 140 that is desired.

A cam pin 364 is attached to the timing gear 358 adjacent the perimeter of the timing gear 358. The cam pin 364 is positioned so that it contacts the actuating lever 356 at a certain rotative position of the timing gear 358. The rotative position of the timing gear 358 thus controls the position of the actuating lever 356 and, hence, the position of the contact arm 354. When both the fan motor 96 and the drive motor 130 are shut off, the cam pin 364 is in the position shown in FIG. 5 wherein the actuator lever 356 is contacted and depressed. In this position, the contact arm 354 is in the dashed-line first position.

The electrical circuit 350 also includes a plug or receptacle 366 which is connected to a source of AC current. A connector 368 is wired to a machine or apparatus, such as a grinding or sanding machine, with which the apparatus 10 is to be used. The connector 368 receives an electrical signal from the machine with which the apparatus 10 is used to initiate the operation of the fan motor 96 whenever the grinding machine or the like is activated. The plug 366 has a ground contact 370 and the connector 368 has a ground contact 372. A ground wire 374 connects the ground contact 370 with a ground wire 376 of the motor 96 through a terminal 378. A ground wire 380 connects the ground contact 372 to the ground wire 376 also through the terminal 378.

The circuit 350 also includes a relay means 380. The relay 380 includes a coil 382 and a contact arm 384. When no current is flowing through the coil 382, the contact arm 384 is biased to a first position shown in full line in FIG. 13. The contact arm 384 is in the first position when both motors 96 and 130 are off. When current is applied through coil 382, the contact arm 384 is pulled to a second position shown in dotted lines.

Current is supplied to the coil 382 when signal current is received from the machine with which the apparatus 10 is utilized. The signal current passes from contact 386 of the connector 386 through a conductor line 388, through the coil 382, and back to a contact 390 of the connector 368 through a conductor line 392.

A first or hot contact 394 of the plug 366 is connected to a common contact 396 of the contact arm 384 via a conductor line 398. A second or neutral contact 400 of the plug 366 is connected to a contact 402 of the fan motor 96 via a conductor line 404, the terminal 378, and a conductor line 406. The second contact 400 is also connected to a contact 408 on one side of the motor 130 via the line 404, the terminal 378 and a conductor line 410.

A first contact 412 of the relay means 380 is connected to a first contact 414 of the microswitch 352 via a conductor line 416, a delay means 418, and a conductor line 420. The delay means 418 delays passing current from line 416 to line 420 for a specified period of time, such as ten seconds. Delay means 418 is a conventional electronic component and hence is only shown in block form. A delay mechanism produced by the Artisan Corporation has been found suitable.

A second contact 422 of the relay means 380 is connected to a contact 424 of the motor 96 through a conductor line 426. The open contact 422 is also connected to a second contact 428 of the microswitch 352 via the line 426, the terminal 378 and a conductor line 430. A protective fuse 432 is interposed between a common contact 434 of the microswitch 352 and one side of the motor 130.

The circuit 350 operates in the following manner to control the operation of the apparatus 10. As was mentioned above, when both the motor 96 and the motor 130 are off, the contact arm 384 of the relay 380 is in the first position in contact with the contact 412 and the contact arm 354 of the microswitch 352 is in its first position in contact with the contact 428. In this manner, an open circuit is presented to both motors 96 and 130, since the contact 422 is out of contact with the arm 384. When a signal is received from the machine with which the apparatus 10 is utilized, relay coil 382 is energized by current flowing in the circuit which includes lines 388 and 392. When coil 382 is energized, arm 384 is moved to the second position in contact with the contact 422. Current is thereby applied to the fan motor 96 when the circuit is completed through the lines 398, 426, 406, and 404. Current is also supplied to the motor 130 via a closed circuit through lines 398, 426, 430, 410 and 404.

As current is supplied to the motor 130, the drive shaft 140 is rotated. The timing gear 358 is thereby rotated by the drive gear 362. When the relay 380 is initially activated, the cam pin 364 is in the position shown in FIG. 5. In this position, the contact arm 354 is held in the first position. After the timing gear 358 has rotated approximately 15°, the cam pin 364 loses contact with the actuator lever 356. The actuator lever 356 thereby moves and allows the contact arm 354 to move to the second position in contact with contact 414. The contact arm 354 is biased to the second position. The circuit to the motor 130 is thereby opened since in the second position of the microswitch 352 current must be supplied through lines 416, 420 and the delay 418. The motor 130 thereby stop after approximately a 15° rotation of the timing gear 358, however, the fan motor 96 continues to run as long as current is supplied to the coil 382.

After the grinding or like operation of the machine with which the apparatus 10 is being used is completed, the signal to the connector 368 is shut off and current stops flowing through the coil 382. The contact arm 384 thereby moves back to its first position in contact with the contact 412. Current is thereby again supplied to the motor 130 via a closed circuit through lines 398, 416, delay mechanism 418, lines 420, 410, and 404. An approximate ten-second delay is utilized through the delay mechanism 418 to allow the fan 98 which is driven by fan motor 96 to wind down and stop. The motor 130 thus rotates the drive shaft 140 and the timing gear 358 is rotated by the drive gear 362. During the rotation of the shaft 140, the twisting of the filter 62 occurs. The rotation of the timing gear 358 continues until the cam pin 364 again contacts the actuator lever 356. When the cam pin 364 contacts the actuator lever 356, the contact arm 354 is moved to its first position in contact with contact 428. The circuit to the motor 130 is thereby again opened since the contact arm 384 is in the first position. The two contact arms 354, 384 are now in position to again initiate cycling of the apparatus 10 when the coil 382 is activated.

The preferred mode of operation of the apparatus 10 is through use of the circuit 350. However, the apparatus 10 may also be operated directly through an on-off switch.

Figure 9:
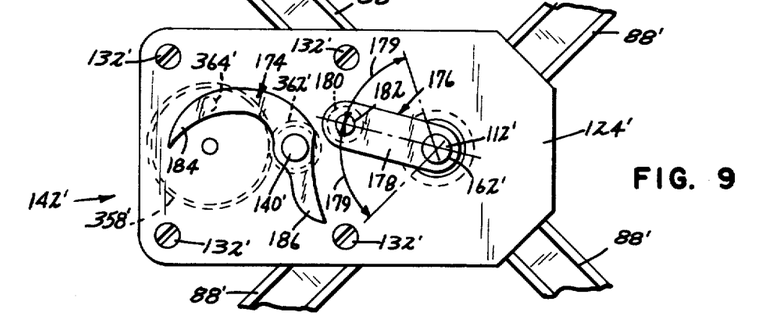
FIG. 9 is a view similar to FIG. 5 illustrating a second embodiment of a camming mechanism in a neutral position.
Figure 10:
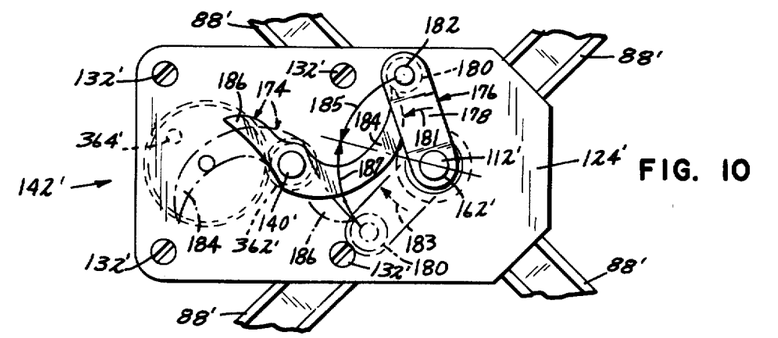
FIG. 10 is a view similar to FIG. 6 illustrating the second embodiment of the camming mechanism in other positions.
Figure 11:
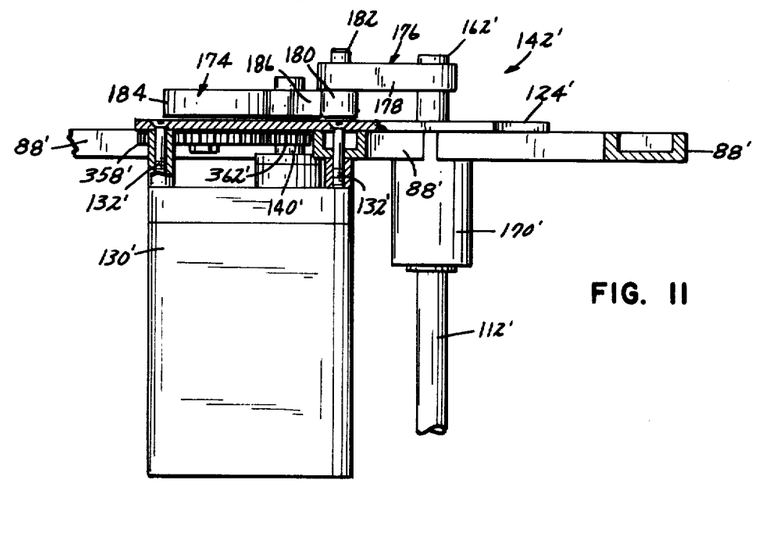
FIG. 11 is a partial elevational and partial sectional view illustrating the rod rotating mechanism utilized with the camming mechanism of FIGS. 9 and 10.

FIGS. 9, 10 and 11 illustrates a second embodiment of the camming means 142. The second embodiment of the camming means 142 is designated generally as 142'. Elements of the camming means 142' which are common to the camming means 142 will be indicated by like primed numerals.

The camming means 142' is driven by drive shart 140' of a drivemotor 130'. A cam plate 174 is fixedly secured to the drive shaft 140'. The drive motor 130' rotates the drive shaft 140' and the cam plate 174 in a clockwise direction as shown in FIGS. 9 and 10. A cam follower 176 engages the cam plate 174 to drivingly couple the cam plate 174 to the torque rod 112'. The cam follower 176 includes a torque arm 178 fixedly secured at one of its ends to the top end 162' of the torque rod 112'. The other end of the torque arm 178 rotatably carries a cam bearing 180. The bearing 180 is rotatably secured to the torque arm 178 by a fastening pin 182.

The cam plate 174 has a first curved section 184 and a second curved section 186. The neutral position of the rod 112' is shown in FIG. 9. A filter (not shown) similar to filter 62 is coupled to rod 112' and also assumes the neutral position. As the cam plate 174 rotates in the clockwise direction, the first section 184 contacts the bearing 180 to turn the torque arm 178 and the torque rod 112' in a clockwise direction. The end point of the clockwise motion of the torque arm 178 is shown in full line in FIG. 10. As the cam plate 174 continues to rotate, the first section 184 loses contact with the bearing 180. The natural bias of the filter thereafter causes the filter and the rod 112' to snap back to the neutral position. The return movement of the torque arm 178 is illustrated as arrow 181 in FIG. 10. As the cam plate 174 continues its clockwise rotation, the bearing 180 loses contact with the second section 186. The natural bias of the filter again causes the filter and the rod 112' to snap back to the neutral position. The second return movement of the torque arm 178 is illustrated as arrow 183 in FIG. 10. A similar mechanism as is utilized with the camming means 142 may be utilized with the camming means 142' to cause the drive shaft 140' to rotate a specified number of times. The total arc through which the rod 112' rotates is illustrated by arrows 179 in FIG. 9. As seen in FIG. 10, the total arc is divided into arcs (illustrated by arrows 185, 187) of approximately one-half the total arc.

The following is a brief overall summary of the operation of the particulate material removing means 110. As mentioned above, particulate material is carried by the air into the filtering chamber 42 and collects upon the outer surface of the filter 62. After the apparatus 10 has operated for a certain amount of time, an amount of particulate material collects upon the outer surface of the filter 62. As the amount of particulate material collected on the outer surface of the filter 62 increases, the particulate material begins to block the filter 62 and decrease the efficiency of the apparatus 10. Hence, periodic cleaning of the filter 62 is necessary. The particulate material removing means 110 is utilized for this purpose. The rotating means 122 and the camming means 142 intermittently rotate the rod 112, the closure plate 72 coupled thereto, and the longitudinal end of the filter 62 which is attached to the closure plate 72 through angular displacements of less than 90° in opposite rotative directions. The rotation of the bottom end 68 of the filter 62 results in the twisting of filter 62. As the filter 62 twists, its overall length shortens, the space between the bottom of the block 118 and the bottom of the box 116 permits this contraction. The twisting of the filter 62 releases the particulate material collected on the outer surface of the filter 62. The parts associated with the camming means 142' are rotated in a manner similar to that of camming means 142. The released particulate material thereafter falls into the tray 18. A downwardly sloped flange 131 is attached to the inner walls of the central section 14 and extends around the entire inner periphery. The flange 131 directs the released particulate material into the tray section 18.

A second embodiment of the apparatus 10 is shown in FIGS. 14–19 and is designated generally as 10A. The parts of apparatus 10A which correspond to similar parts of apparatus 10 will be indicated with like numerals followed by the letter A.

Figures 14, 15, 16, 17:
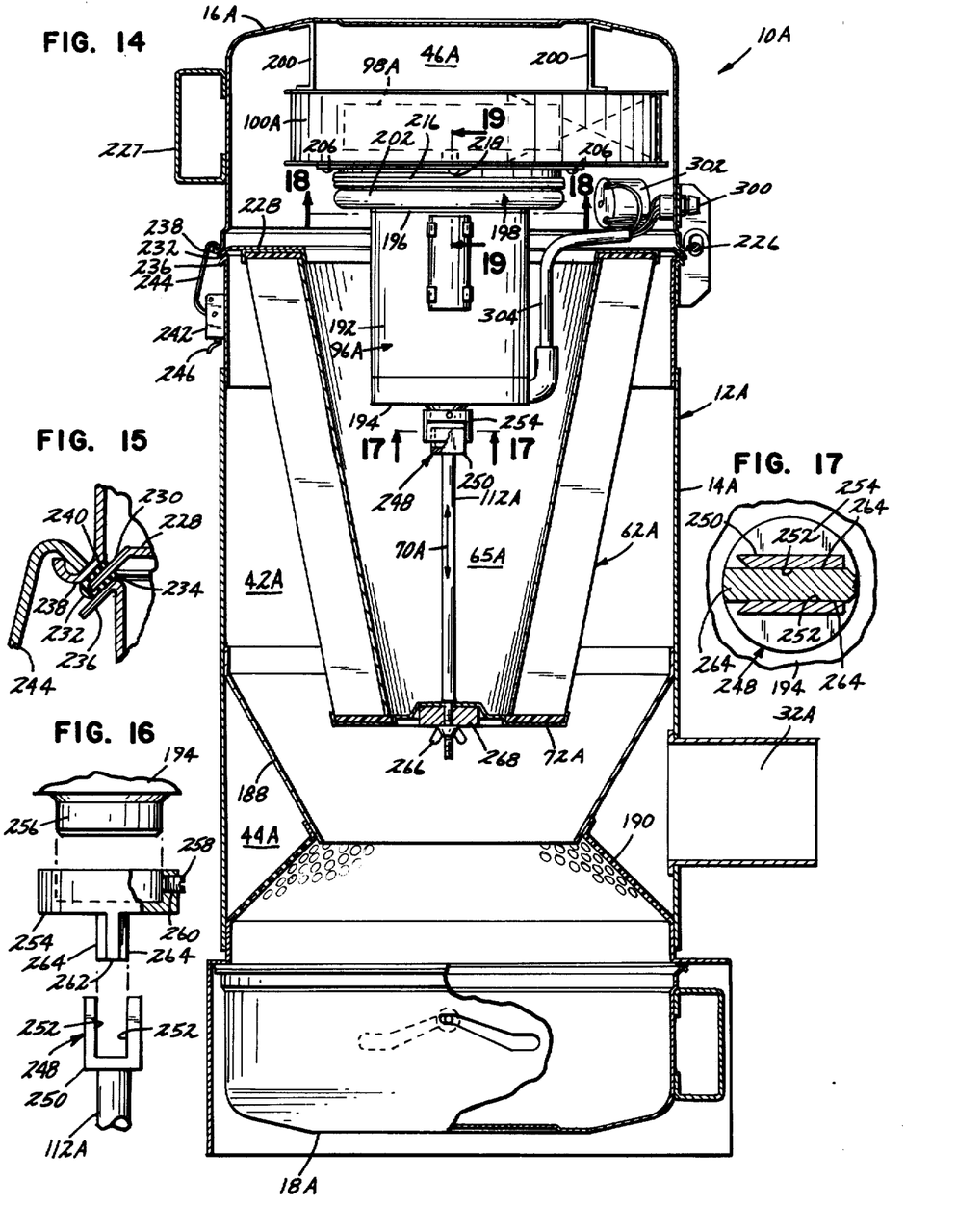
FIG. 14 is a partial elevational and partial sectional view illustrating a second embodiment of apparatus according to the present invention.
FIG. 15 is a sectional view illustrating a clamp utilized with the second embodiment.
FIG. 16 is an elevational view, partially broken away, of a slip connector utilized with the second embodiment of the invention.
FIG. 17 is a view taken along lines 17-17 of FIG. 14.

The apparatus 10A includes a housing 12A divided into a central section 14A, a removable top section 16A, and a removable bottom tray section 18A. An air inlet aperture 32A is formed in the central section 14A and communicates with an air inlet chamber 44A. The air inlet chamber 44A is bounded by walls of the central section 14A, a solid partition 188 and a perforate partition 190. The perforate partition 190 serves as an initial screening element to separate large particulate material from the air which is passing through the apparatus 10A. A filtering chamber 42A is formed about the filter 62A downstream of the chamber 44A. The filter 62A serves to filter fine particulate material from the air passing through the apparatus 10A. The air passing through the apparatus 10A passes from the chamber 42A to the hollow interior 65A of the filter 62A. Thereafter the air is drawn to a clean air chamber 46A which surrounds a fan wheel 98A. The fan wheel 98A draws the air through the inlet aperture 32A and through the apparatus 10A to an outlet aperture (not shown).

In the apparatus 10A a separate motor is not utilized to twist the filter 62A. The fan or blower motor 96A forms a portion of the means to twist the filter 62A. The fan motor 96A includes a casing 192 which surrounds the internal components of the motor 96A. The casing 192 is disposed at least partially within the hollow interior 65A. The casing 192 has a generally cylindrical configuration with a closed bottom end 194 and an upper mounting end 196. A longitudinal axis of the casing 192 extends between the ends 194, 196 and is substantially coextensive with the axis of the filter 62A, illustrated as arrows 70A. The mounting end 196 is coupled to a lazy susan-type bearing, designated generally as 198. The lazy susan-type bearing 198 is fixedly secured to a bottom surface of the fan scroll or encasement 100A. The encasement 100A is fixedly secured to the interior of the removable top section 16A by beams 200.

Figures 18, 19, 20, 21:
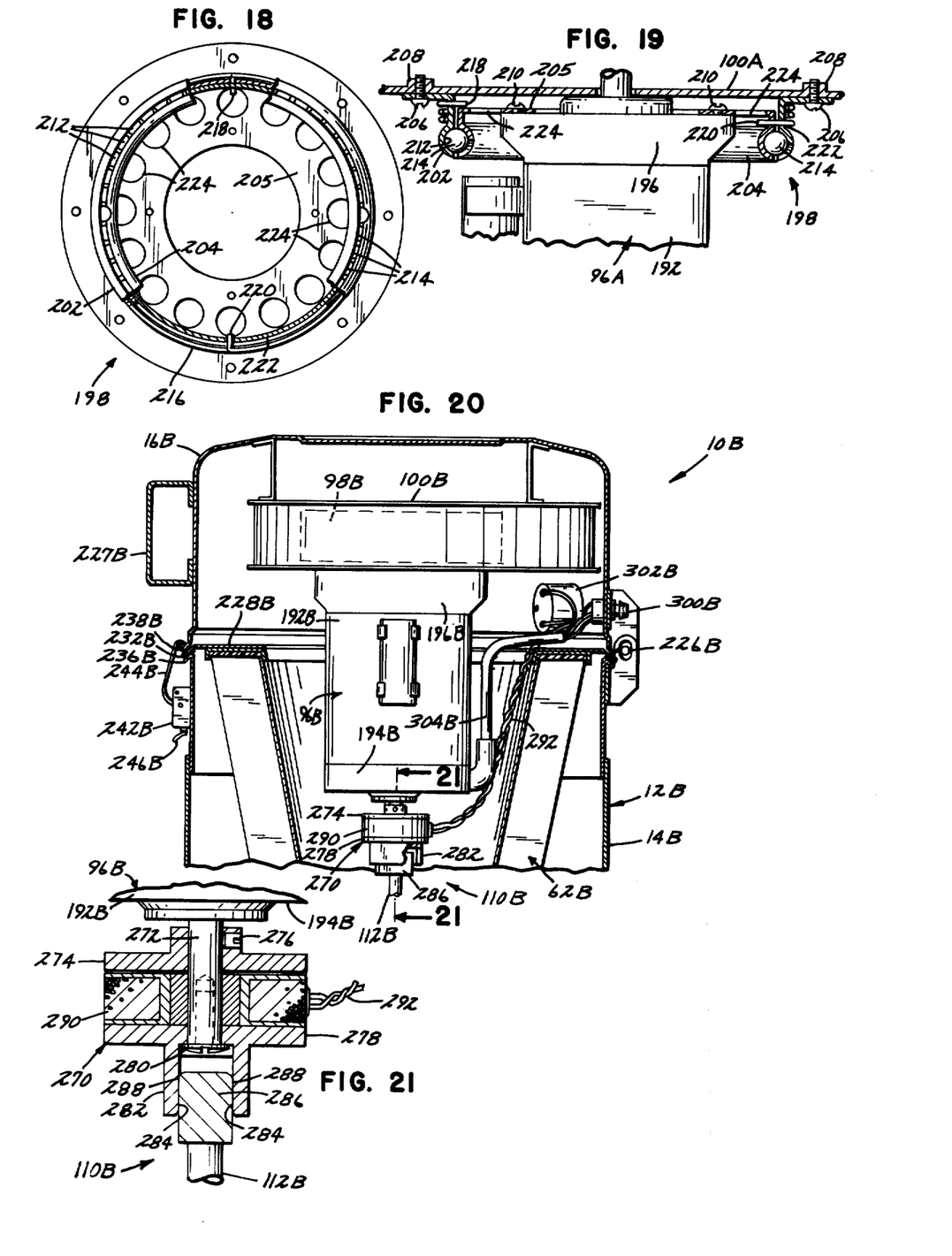
FIG. 18 is a view taken along lines 18-18 of FIG. 14.
FIG. 19 is a view taken along lines 19-19 of FIG. 14.
FIG. 20 is a fragmentary partial elevational and partial sectional view of a third embodiment of apparatus according to the present invention.
FIG. 21 is a view taken along lines 21—21 of FIG. 20.

As best seen in FIG. 19, the lazy susan bearing 198 includes an outer ring 202 and an inner ring 204. An annular disc 205 is attached to and extends radially inward from the inner ring 204. The outer ring 202 is fixedly secured to the bottom of the fan scroll 100A by a plurality of bolts 206 and nuts 208. The annular disc 205 is fixedly secured to the upper end 196 of the motor casing 192 by a plurality of fasteners 210. A tubular race 212 is formed between the inner circular surfaces of the rings 202, 204. A plurality of ball bearings 214 are received within the bearing race 212. In this manner, the inner ring 204 and the motor casing 192 attached thereto can rotate with respect to the fan scroll 100A.

A biasing spring 216 is carried about the rings 202, 204. One end 218 of the spring 216 is fixedly secured to the outer ring 202. The other end 220 of the spring 216 passes through a slot 222 in the outer ring 202 and is fixedly secured to the inner ring 204. The spring 216 biases the motor casing 192 to a neutral position with respect to the housing 12A. The biasing spring 216 may be eliminated and the natural tendency of the filter 62A to remain in an untwisted condition can be used to bias the motor casing 192 to the netural position. A plurality of holes 224 are formed in the annular disc 205 to provide ventilation for the motor 96a.

So that ready access may be gained to the interior of the housing 12A and the motor 96A, the top section 16A is attached to the central section 14A by means of a hinge 226. A handle 227 is attached to the outer surface of the top section 16A to aid in pivoting the top section 16A about the hinge 226. The filter 62A is removably held within the housing 12A by means of a removable partition 228. The filter 62A extends downwardly from a hole formed in the removable partition 228 and has its upper end secured to the lower surface of the partition 228. As best seen in FIG. 15, a downwardly sloped flange 230 extends around the entire perimeter of the removable partition 228. A clip or gasket 232, which is U-shaped in cross section, is secured to the end of the flange 230 around the entire perimeter of the partition 228. A lower leg 234 of the gasket 232 rests upon a downwardly sloped support flange 236 which extends around the entire upper edge of the central section 14A. A downwardly sloped pressure flange 238 which forms a lower rim of the top section 16A contacts and presses against an upper leg 240 of the gasket 232. A clip means 242 is attached to the central section 14A. The clip means 242 forces the pressure flange 238 against the upper leg 240 so that the gasket 232 forms an airtight seal between the central section 14A and the top section 16A. The clip means 242 includes a clip arm 244 and an actuation lever 246. The actuation lever 246 forces the clip arm 244 into and out of engagement with the pressure flange 238.

A slip connector 248 connects the torque rod 112A to the lower end 194 of the motor housing 192. The slip connector 248 transmits any rotary motion of the housing 192 to the torque rod 112A while permitting the torque rod 112A to move along its longitudinal axis toward and away from the motor casing 192. The slip connector 248 includes a clevis 250 fixedly secured to the upper end of the torque rod 112A. A pair of opposing flat walls 252 form interior surfaces of the clevis 250. A coupling member 254 is removably secured to the bottom end 194. A knob 256 extends downwardly from the bottom end 194. The coupling member 254 is received about the knob 256 and is fixed in position by means of a set screw 258 which screws into a tapped hole 260 through the coupling member 254. A tongue 262 extends downwardly from the coupling member 254 and has opposing flat surfaces 264 which mate with the flat surface 252 of the clevis 250. The mating flat surfaces 252, 264 transmit the rotary motion of the casing 192 to the torque rod 112A. Also, since the clevis 250 has an open top, the tongue 262 can be withdrawn from the clevis 250. Access to the interior of the apparatus 10A can thus be attained by releasing clip means 242 and pivoting the top section 16A about the hinge 226.

The lower end of the torque rod 112A is fixedly secured to the closure plate 72A by means of a wing nut 266 and a washer 268. The torque rod 112A is secured to the closure plate 72A in such a manner that the rotary motion of the torque rod 112A is transmitted to the closure plate 72A and, hence, to the filter 62A. The length of the torque rod 112A and the disposition of the clevis 250 and the tongue 262 are selected so that a gap exists between the bottom of the clevis 250 and the bottom of the tongue 262 when the filter 62A is in its neutral position. As with the coupling means 114 this gap permits the plate 72A to move upward when the filter 62A twists.

The particulate material removing means 110A operates in the following manner. An on-off switch 300 controls the fan motor 96A through a terminal 302 and conductive wires 304. When the fan motor 96A is initially turned on, reaction torque causes the motor housing 192 to rotate within the lazy susan bearing 198 against the bias of the spring 216 or the natural bias of the filter 62A. The rotation of the motor casing 192 is transmitted to the closure plate 72A and the filter 62A via the slip connector 248 and the torque rod 112A. After the motor 96A reaches a steady speed, the initial reaction torque is no longer present and the spring 216 or the natural bi..s of the filter 62A rotates the motor housing 192 substantially back to its neutral position. The rotation of the motor housing 192 to and from its neutral position generally occurs in a quick snap-type manner so that the filter 62A twists in a quick snap-type action which releases the particulate material collected on its outer surface. Greater snap-type action is attained when the spring 216 is not used. If a series of twists is desired, a jog-type switch could be used as the on-off switch. The jog-type switch would send a series of on-off pulses to the motor 96A prior to turning the motor 96A on to a steady state basis. This would cause a series of reaction torque actions to take place.

A third embodiment of apparatus 10, designated generally as apparatus 10B, is illustrated in FIGS. 20 and 21. The apparatus 10B is similar to the apparatus 10A except that the motor casing 192B is fixed relative to the housing 12B and that the particulate material removing means 110B is comprised of an electromagnetic clutch means 270 which intermittently couples a second drive shaft 272 of the fan motor 96B to the torque rod 112B. A first drive shaft (not shown) rotates the fan wheel 98B. The second drive shaft 272 extends downwardly from the fan motor 98B and is in axial alignment with the torque rod 112B.

The electromagnetic clutch means 270 includes an upper clutch plate 274 which is made of a ferromagnetic material. The upper clutch plate 274 is removably secured to the second drive shaft 272 by a set screw 276. A lower clutch plate 278 is freely rotatable with respect to the second drive shaft 272. The lower clutch plate 278 is rotatably supported on the lower end of the shaft 272 by a bearing head 280. A clevis 282 which has flat inner surfaces 284 is fixedly secured to the lower surface of the lower clutch plate 278. A tongue 286 is fixedly secured to the upper end of the torque rod 112B and has a pair of opposing flat surfaces 288 which mate with the flat surfaces 284. An electromagnetic coil 290 is fixedly secured to the upper surface of the lower clutch plate 278. Conductive wires 292 connect the coil 290 to a source of electrical current. When no current is supplied to the coil 290, a slight gap exists between the upper surface of the coil 290 and the lower surface of the upper clutch plate 274. When current is supplied to the coil 290, the coil 290 is magnetically drawn toward the clutch plate 274 and becomes fixed relative to the clutch plate 274.

Apparatus 10B operates in the following manner. An on-off switch 300B controls the fan motor 96B through a terminal 302B and conductive wires 304B. As in the earlier embodiments, the rotation of the fan 98B draws the particulate material-laden air through the apparatus 10B in such a manner that the fine particulate material is collected upon the outer surface of the filter 62B. So that the particulate material collected upon the outer surface of the filter 62B may be removed at the end of an operating cycle of the apparatus 10B, a pulsing means (not shown) intermittently applies current to the coil 290 through the conductive wires 292. The pulsing means sends intermittent pulses of current to the coil 290 when the motor 96B is shut off after a cycle of operation. After the motor 96B has been shut off, the inertia of the motor 96B continues to rotate the second drive shaft 272 and the fan 98B. The intermittent actuation of the coil 290 intermittently couples the driven shaft 272 to the torque rod 112B for a short period of time so that the filter 62B is twisted a slight amount without causing damage to the filter 62B itself. Damage to the filter 62B is also prevented because the clutch means 270 allows slippage between the upper clutch plate 274 and the coil 290 if too great a rotational force is exerted. When current is not supplied to the coil 290, the natural tendency of the filter 62B to untwist returns the filter 62B to a neutral position. Thereafter, the reactivation of the coil 290 again causes the drive shaft 272 to couple to the torque rod 112B. This operation continues for a short period of time until the fan motor 96B has completely wound down and stopped rotating.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad generally meaning of the terms in which the appended claims are expressed.

What is claimed is:

1. Self-cleaning apparatus for removing particulate material from air comprising:
    (a) a housing having an air inlet and an air outlet;
    (b) filtering means comprising a hollow frusto-conical shaped filter;
    (c) said filter having an outer surface, an open interior, opposite open ends with one of said ends having a larger diameter than the other end, and a longitudinal axis extending between the ends;
    (d) said filter being formed of a pleated pourous media;
    (e) means for removably securing the end with the larger diameter within said housing;
    (f) a closure plate secured to and sealing the other end;
    (g) means defining a first chamber around the outer surface of said filter, said first chamber being in communication with said air inlet whereby air moving from said inlet to said outlet passes through said filter into the interior thereof and deposits particulate material on said outer surface of the filter;
    (h) means for removing particulate material collected on the outer surface of said filter by twisting said filter;
    (i) means for biasing said filter to a neutral position wherein said filter is in an untwisted condition; and
    (j) said removing means including a rotatable rod having a longitudinally extending axis, said rod extending from said plate in a direction generally transverse to a major face of said plate, means for drivingly coupling said rod to said plate, camming means engaging said rod for rotating said rod from said neutral position of said rod in a first rotative direction through an angular displacement less than 90° and for rotating said rod from said neutral position in an opposite rotative direction through an angular displacement less than 90°, said coupling means transferring the rotary motion of said rod to said plate while permitting said rod to move transversely of said major face of the plate, and a drive motor for driving said camming means.

2. An apparatus in accordance with claim 2 wherein said camming means includes a cam plate fixedly secured to a drive shaft driven by said drive motor and a cam follower drivingly coupled to said rod, the longitudinal axis of said rod and said drive shaft being so disposed that the cam plate cooperating with said cam follower rotates said rod in said first and second rotative directions, said cam plate contacting said follower to turn said rod in the first rotative direction and contacting said follower to turn said rod in the second rotative direction, and said cam plate having space to permit said filter biasing means to return said filter and rod to said neutral position between the rotation in said first rotative direction and the rotation in said second rotative direction, and to permit said filter biasing means to return said filter and rod to said netural position between the rotation in said second rotative direction and the rotation in said first rotative direction.

3. An apparatus in accordance with claim 2 including a timing gear rotatably supported in said housing, a drive gear fixedly secured to said drive shaft for rotation therewith, said timing gear being drivingly coupled to said drive gear, and control means coupled to said timing gear for stopping the drive motor after substantially one rotation of said timing gear.

4. An apparatus in accordance with claim 3 wherein said timing gear is in at least a three-to-one gear ratio to said drive gear whereby for one rotation of said timing gear said drive shaft will rotate at least three times.

5. An apparatus in accordance with claim 1 wherein the interior of said housing is divided into a plurality of chambers, an air inlet chamber being in communication with said air inlet and being bounded by said housing, imperforate partitions and a perforate partition, said perforate partition providing communication between said air inlet chamber and said filtering chamber whereby coarse particulate material is separated from the air by said perforate partition and finer particulate material is separated from the air by said filter.

6. An apparatus in accordance with claim 5 wherein said housing includes a removable tray disposed below and in communication with said filtering and air inlet chambers, said tray extending below substantially all of said filtering and air inlet chambers and including an imperforate dividing wall substantially coextensive with said perforate wall whereby said tray is divided into two discrete receiving receptacles with each receptacle communicating with one of said chambers.

7. An apparatus in accordance with claim 6 including an upper partition extending horizontally across an upper end of said filtering and air outlet chambers, said upper partition being supported by walls forming said housing and having a first hole in communication with said filtering chamber and a second hole in communication with said air outlet chamber.

8. An apparatus in accordance with claim 7 including a fan for drawing air through said housing and a drive motor for rotating said fan, said fan and drive motor being with said second hole and extending into said air outlet chamber, said filter being disposed in said first hole and extending downwardly into said filtering chamber, said open interior being in direct communication with said first hole, said air outlet chamber being disposed above said air inlet chamber and being separated therefrom by one of the imperforate partitions defining said air inlet chamber, said air outlet chamber being disposed laterally of said filtering chamber and being separated therefrom by another imperforate partition, an air transfer conduit being formed between a top of said housing and said upper partition to provide a path for air passing from the interior of said filter to said air outlet chamber, said air outlet being formed through a wall of said housing.

9. Self-cleaning apparatus for removing particulate material from air comprising:
(a) a housing having an air inlet and an air outlet;
(b) filtering means comprising a hollow generally tubular filter;
(c) said filter having an outer surface, an open interior, opposite first and second ends and a longitudinal axis extending between the ends;
(d) said filter being formed of a porous media;
(e) means for securing said first end of said filter relative to said housing so that the longitudinal axis extends generaly vertically;
(f) a closure plate connected to said second end of said filter for closing said second end of said filter, said first end being open and in communication with said air outlet;
(g) means defining a filtering chamber around the outer surface of said filter, said filtering chamber being in communication with said air inlet whereby air moving from said inlet to said outlet passes through said filter into the interior thereof and deposits particulate material on said outer surface of said filter;
(h) means connected to said closure plate for twisting said filter about said axis to remove particulate material collected on the outer surface of said filter;
(i) said twisting means including a rod having a longitudinal axis, said rod being rotatable about its axis, said rod extending from said closure plate in a direction generally transverse to a major face of said closure plate, means for intermittently rotating said rod, means coupling said rod to said plate, said coupling means transferring the rotary motion of said rod to said plate while allowing one of said rod and said plate to move relative to the other of said rod and said plate in a direction transverse of the major face of said plate;
(j) means for biasing said filter and said rod to a neutral position wherein said filter is not twisted; and
(k) said intermittent rod rotating means including a drive motor, a drive shaft rotated by said drive motor about its longitudinal axis, and camming means driven by said drive shaft for rotating said rod from said neutral position of said rod in a first rotative direction through an angular displacement less than 90 degrees.

10. An apparatus in accordance with claim 9 wherein said camming means includes a cam plate secured to said drive shaft for rotation therewith and a cam follower for drivingly coupling said rod to said cam plate, said drive shaft being driven in a single rotative direction, the longitudinal axis of said rod and said drive shaft being so disposed that the cam plate cooperating with said cam follower rotates said rod in said first rotative direction and in a second opposite rotative direction, said cam plate contacting said follower to turn said rod in the first rotative direction and contacting said follower to turn said rod in the second rotative direction.

11. An apparatus in accordance with claim 10 wherein said cam plate has space to permit said filter biasing means to return said filter and rod to said neutral position between the rotation in said first rotative direction and the rotation in said second rotative direction, and to permit said filter biasing means to return said filter and rod to said neutral position between the rotation in said second rotative direction and the rotation in said first rotative direction.

12. An apparatus in accordance with claim 9 including a blower fan motor supported in said housing, a blower fan drive shaft extending from and driven by said blower fan motor, and a blower fan drivingly coupled to said blower fan drive shaft, whereby rotation of said blower fan moves air through said housing.

13. An apparatus in accordance with claim 12 including a control means connected to said drive motor for controlling the number of rotations of said drive shaft in a selected time period.

14. An apparatus in accordance with claim 13 wherein said control means includes a timing gear supported for rotation adjacent said drive shaft, a drive gear fixedly secured to the drive shaft of said drive motor for rotation therewith, said drive gear drivingly engaging said timing gear to rotate said timing gear when the drive shaft of said drive motor rotates, said timing gear and said drive gear being in a gear ratio such that for one rotation of said timing gear the drive shaft of said drive motor rotates a number of times, and circuit means coupled to said timing gear for starting and stopping the rotation of the drive shaft of said drive motor.

15. An apparatus in accordance with claim 14 wherein said circuit means includes a control circuit having a relay adapted to receive an electrical signal from an external source and connected to control said blower fan motor and a microswitch positioned for activation by said timing gear and operatively connected to said relay and to said drive motor for controlling the operation thereof.

16. An apparatus in accordance with claim 15 wherein said relay includes a contact arm and an actuating coil, said contact arm having a common contact and a movable contact, said movable contact being movable between a first and a second contact, said movable contact being biased to said first contact and being moved to said second contact when current is applied to said coil, said microswitch including a second contact arm having a second common contact and a second movable contact, said second movable contact being movable between another first contact and another second contact, said second contact arm being biased to said other first contact and being moved to said other second contact by said timing gear, said first common contact being connected to a first side of a source of electrical current, said second common contact being connected to one side of said drive motor and the other side of said drive motor being connected to a second side of said source of electrical current, said second side of said source of electrical current also being connected to a first side of said blower fan motor, said first contact being connected to the other first contact through a time delay means, said second contact being connected to a second side of said blower fan motor and to the other second contact whereby said blower fan motor is driven only when current is applied to said coil and said drive motor is driven when said first movable contact is connected to said second contact and said second movable contact is connected to the other second contact and also when said first movable contact is connected to said first contact and said second movable contact is connected to the other first contact.

17. An apparatus in accordance with claim 9 including a control means for automatically controlling the starting and stopping of said particulate material-removing means.

18. An apparatus in accordance with claim 9 wherein the interior of said housing is divided into a plurality of chambers including said filtering chamber and an air inlet chamber said air inlet chamber being in communication with said air inlet and being bounded by portions of said housing, imperforate partitions within said housing and a perforate partition within said housing, said perforate partition providing communication between said air inlet chamber and said filtering chamber whereby coarse particulate material is separated from the air by said perforate partition and finer particulate material is separated from the air by said filter.

19. An apparatus in accordance with claim 18 wherein said housing includes a removable tray disposed below and in communication with said filtering and air inlet chambers, said tray extending below substantially all of said filter and air inlet chambers and including an imperforate dividing wall substantially coextensive with said perforate wall whereby said tray is divided into two discrete receiving receptacles with each receptacle communicating with one of said chambers.

20. An apparatus in accordance with claim 19 including a fan for drawing air through said housing and a drive motor for rotating said fan, said fan and drive motor being disposed in an air outlet chamber, said air outlet chamber being disposed above said air inlet chamber and being separated therefrom by one of the imperforate partitions defining said air inlet chamber, an air transfer conduit being formed between a top of said housing and uppermost portions of said filtering and air outlet chambers to provide a path for air passing from the interior of said filter to said air outlet chamber, said air outlet being formed through a wall of said housing.

21. Self-cleaning apparatus for removing particulate material from air comprising:
 (a) a housing having an air inlet and an air outlet;
 (b) filtering means comprising a hollow generally tubular filter;
 (c) said filter having an outer surface, an open interior, opposite first and second ends and a longitudinal axis extending between the ends;
 (d) said filter being formed of a porous media;
 (e) means for securing said first end of said filter relative to said housing so that the longitudinal axis extends generally vertically;
 (f) a closure plate connected to said second end of said filter for closing said second end of said filter, said first end being open and in communiction with said air outlet;
 (g) means defining a filtering chamber around the outer surface of said filter, said filtering chamber being in communication with said air inlet whereby air moving from said inlet to said outlet passes through said filter into the interior thereof and deposits particulate material on said outer surface of said filter;
 (h) means connected to said closure plate for twisting said filter about said axis to remove particulate material collected on the outer surface of said filter;
 (i) said twisting means including a rod having a longitudinal axis, said rod being rotatable about its axis, said rod extending from said closure plate in a direction generally transverse to a major face of said closure plate, means for intermittently rotating said rod, means coupling said rod to said plate, said coupling means transferring the rotary motion of said rod to said plate while allowing one of said rod and said plate to move relative to the other of said rod and said plate in a direction transverse of the major face of said plate;
 (j) means for biasing said filter and said rod to a neutral position wherein said filter is not twisted;
 (k) said intermittent rod rotating means including a drive motor, a draft shaft rotated by said drive motor about its longitudinal axis, and means driven by said drive shaft for turning said rod through an angular displacement less than 180 degrees; and (l) control means connected to said drive motor for controlling the number of rotations of said drive shaft in a selected time, said control means including a timing gear supported for rotation adjacent said drive shaft, a drive gear fixedly secured to the drive shaft of said drive motor for rotation therewith, said drive gear drivingly engaging said timing gear to rotate said timing gear when the drive shaft of said drive motor rotates, said timing gear and said drive gear being in a gear ratio such that for one rotation of said timing gear the drive shaft of said drive motor rotates a number of times, and circuit means coupled to said timing gear for starting and stopping the rotation of the drive shaft of said drive motor.

22. An apparatus in accordance with claim 21 including a blower fan motor supported in said housing, a blower fan drive shaft extending from and driven by said blower fan motor, and a blower fan drivingly coupled to said blower fan drive shaft, whereby rotation of said blower fan moves air through said housing.

23. An apparatus in accordance with claim 22 wherein said circuit means includes a control circuit having a relay adapted to receive an electrical signal from an external source and connected to control said blower fan motor and a microswitch positioned for activation by said timing gear and operatively connected to said rely and to said drive motor for controlling the operation thereof.

24. An apparatus in accordance with claim 23 wherein said relay includes a contact arm and an actuating coil, said contact arm having a common contact and a movable contact, said movable contact being movable between a first and a second contact, said movable contact being biased to said first contact and being moved to said second contact when current is applied to said coil, said microswitch including a second contact arm having a second common contact and a second movable contact, said second movable contact being movable between another first contact and another second contact, said second contact arm being biased to said other first contact and being moved to said other second contact by said timing gear, said first common contact being connected to a first side of a source of electrical current, said second common contact being connected to one side of said drive motor and the other side of said drive motor being connected to a second side of said source of electrical current, said second side of said source of electrical current also being connected to a first side of said blower fan motor, said first contact being connected to the other first contact through a time delay means, said second contact being connected to a second side of said blower fan motor and to the other second contact whereby said blower fan motor is driven only when current is applied to said coil and said drive motor is driven when said first movable contact is connected to said second contact and said second movable contact is connected to the other second contact and also when said first movable contact is connected to said first contact and said second movable contact is connected to the other first contact.

25. Self-cleaning apparatus for removing particulate material from air comprising:
(a) a housing having an air inlet and an air outlet;
(b) filtering means comprising a hollow generally tubular filter;
(c) said filter having an outer surface, an open interior, opposite first and second ends and a longitudinal axis extending between the ends;
(d) said filter being formed of a porous media;
(e) means for secruing said first end of said filter relative to said housing so that the longitudinal axis extends generally vertically;
(f) a closure plate connected to said second end of said filter, for closing said second end of said filter, said first end being open and in communication with said air outlet;
(g) means defining a filtering chamber around the outer surface of said filter, said filtering chamber being in communication with said air inlet whereby air moving from said inlet to said outlet passes through said filter into the interior thereof and deposits particulate material on said outer surface of said filter;
(h) means connected to said closure plate for twisting said filter about said axis to remove particulate material collected on the outer surface of said filter; and
(i) said twisting means including a rod having a longitudinal axis, said rod being rotatable about its axis, said rod extending from said plate in a direction generally transverse to a major face of said plate, a motor having an outer casing, connecting means connecting said rod to said outer casing, means for mounting said motor and motor casing to said housing for relative rotation with respect to one another, said mounting means allowing said motor casing to rotate relative to said housing when said motor is started, and said connecting means transferring the rotary motion of said casing to said rod while permitting said rod and said plate to move in a direction transverse of the major face of said plate.

26. An apparatus in accordance with claim 25 wherein said motor mounting means includes an annular lazy susan bearing rotatably supporting said motor casing means for biasing said motor casing to a first position, said biasing means permitting said motor to rotate in said annular bearing when said motor is initially started and thereafter returning said motor casing to said first position.

27. An apparatus in accordance with claim 26 wherein said connecting means includes a slip connector having a clevis attached to an upper end of said rod and a tongue connected to a bottom surface of said outer casing, said clevis and tongue having mating surfaces for transmitting rotary motion from said outer casing to said rod, said tongue being disposed in said clevis so that a gap exists between the bottom of the clevis and the bottom of the tongue to allow for upward motion of said rod during the twisting of said filter.

28. Self-cleaning apparatus for removing particulate material from air comprising:
(a) a housing having an air inlet and an air outlet;
(b) filtering means comprising a hollow generally tubular filter;
(c) said filter having an outer surface, an open interior, opposite first and second ends and a longitudinal axis extending between the ends;
(d) said filter being formed of a porous media;
(e) means for securing said first end of said filter relative to said housing so that the longitudinal axis extends generally vertically;

(f) a closure plate connected to said second end of said filter for closing said second end of said filter, said first end being open and in communication with said air outlet;

(g) means defining a filtering chamber around the outer surface of said filter, said filtering chamber being in communication with said air inlet whereby air moving from said inlet to said outlet passes through said filter into the interior thereof and deposits particulate material on said outer surface of said filter;

(h) means connected to said closure plate for twisting said filter about said axis to remove particulate material collected on the outer surface of said filter;

(i) said twisting means including a rod having a longitudinal axis, said rod being rotatable about its axis, said rod extending from said plate in a direction generally transverse to a major face of said plate and into the hollow interior of said filter; and (j) a fan disposed within said housing downstream of said filtering chamber and above said plate, a motor being secured within said housing for driving said fan to draw air through said inlet, to said filtering chamber, through said filter and out of said outlet, a first drive shaft driven by said motor and connected to the fan for driving said fan, a second drive shaft driven by said motor, and means for intermittently connecting said second drive shaft to said rod for intermittently rotating said rod.

29. An apparatus in accordance with claim 28 wherein said intermittent connecting means includes an electromagnetic clutch, a slip connector connected to said clutch for transmitting rotary motion to said rod while permitting said rod to move upwardly and downwardly, means for intermittently activating said electromagnetic clutch to drivingly connect said second drive shaft to said slip connector whereby said rod, the plate and the end of said filter attached thereto are intermittently rotated.

* * * * *